Sept. 30, 1930.   G. N. CHENAULT   1,776,830
COTTON CHOPPING MACHINE
Filed Nov. 9, 1928   2 Sheets-Sheet 1
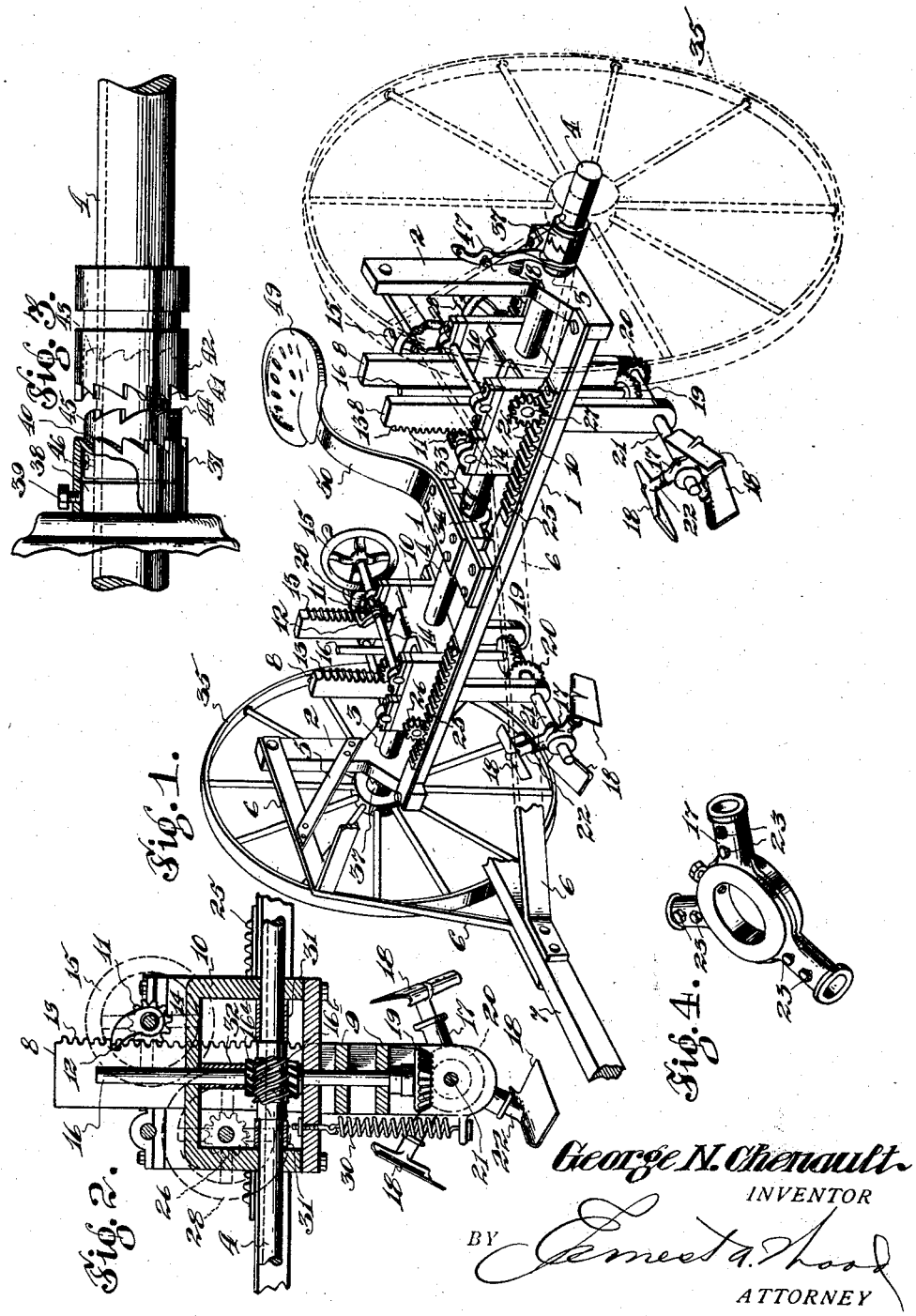
George N. Chenault,
INVENTOR
BY
ATTORNEY Sept. 30, 1930.  G. N. CHENAULT  1,776,830
COTTON CHOPPING MACHINE
Filed Nov. 9, 1928   2 Sheets-Sheet 2
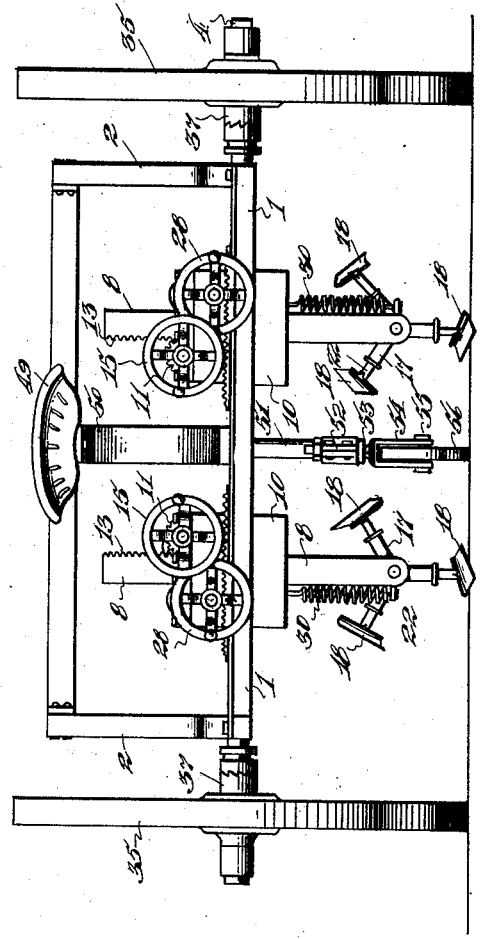

Patented Sept. 30, 1930

1,776,830

UNITED STATES PATENT OFFICE

GEORGE N. CHENAULT, OF DALLAS, TEXAS, ASSIGNOR OF TWENTY-TWO AND ONE-HALF PER CENT TO J. B. STEPHENS, OF HANDLEY, TEXAS, AND TWENTY PER CENT TO H. G. DOSS AND FIVE PER CENT TO H. F. COUCH, BOTH OF DALLAS, TEXAS

COTTON-CHOPPING MACHINE

Application filed November 9, 1928. Serial No. 318,178.

This invention relates to agricultural implements and especially to cotton choppers of the rotary hoe type and its principal object resides in a novel arrangement of gears and shafts to perform in a uniform manner, and with greater speed, the work ordinarily done manually.

Another object of the invention is manifest in its adaptability to operation under various conditions in cotton regions as regards the variations in width of rows and depth of furrows, the rows being wider and the furrows deeper in some parts of the cotton regions than in others.

Still another object of the invention resides in the novel arrangements of the adjustments permitting the operator to disengage at will, the cutting blades, such action being necessary at times due to a poor stand or meager growth of the plant, on such occasions it being necessary to act quickly and the ease with which these adjustments can be made enables the operator to perform the work of several men by the old hand method of cotton chopping in a neater and more uniform and expeditious manner.

A further object of the invention is apparent in the simplicity of its construction and the compartively small cost of production in bringing about a saving in labor cost of raising a crop of cotton, it being a well known fact that, especially in the southland where the bulk of the nation's cotton is grown, farm labor is becoming more scarce and one of the outstanding objects of this invention is to afford a means whereby this condition can be improved.

The numerous novel objects of the invention having been set forth in the foregoing, a more detailed description may be had by reference to the appended drawings in which Figure 1 is a perspective view of the invention, portions of which are shown in broken lines to illustrate the various working parts.

Figure 2 is a cross section of hoe carriage showing worm gears and shaft.

Figure 3 represents the preferred form of clutch used on the invention.

Figure 4 is a perspective view of spider casting for carrying hoes, showing set screws for adjustments.

Figure 5 represents a rear elevational view of the invention showing position of regulating hand wheels Figure 6 is a plan view of the invention showing relativity of gears and adjustment area.

Figure 7 is an elevational view of a tongue truck used on this invention, and

Figure 8 is fragmentary view in detail of worm gear drive.

Proceeding more in detail with the description, reference is primarily made to Figure 1 in which the main frame 1 of the invention is bolted on either end to T shaped castings 2, the lower portions of which are provided with apertures 3 which form bearings for the main shaft or axle 4. The castings 2 are held upright by braces 5 and draft bars 6 which are attached to pole 7.

The hoe operating elements of the invention, a cross section of which is shown in Figure 2, consist of two upright standards 8 held together by cross bars 9. The standards are mounted in main casting 10 and are adapted for vertical movement by means of gears 11, the teeth of which are normally engaged with the teeth 13 on the standards 8. Gears 11 are fixed rigidly to a shaft 14 which is rotatable by means of a hand wheel 15 to enable the hoe carriage to be moved vertically to any desired position, and held in position by a pawl 12.

A shaft 16 interposed between standards 8 and constrained against other than vertical movement by casting 10, drives the cutting elements, the latter each consisting of a spider casting 17 and hoes 18, by means of worm gear 16$^a$ the latter being slidably keyed to the shaft 16 and meshing with worm gear 16$^b$ on the main shaft 4, shown in fragmentary detail in Figure 8.

It will be noted that gears 19 and 20 are in reversed relationship on either side, that is to say, on the right side of the machine the gear 20 is in front of gear 19 while on the left side the gear 19 is in front of gear 20. This arrangement reverses the rotation of shafts 21 of the cutting elements to cause the blades 18, of spider casting 17, to cut in opposite directions. These blades 18 are set on an angle to strike obliquely on the ground or cutting area in the direction of the movement of the machine, thereby reducing the draft load which would be evidenced if the cutting blades were set to strike the cutting area directly crosswise the row. These blades 18 are rigidly attached to shanks 22, which are received by hollow arms of spider casting 17, and are adjustable by sliding the shanks 22 in or out of the arms of the spider casting to desired position and are held fast by set screws 23 in the spider casting.

The spider casting, has three arms extending radially from an apertured center portion, which latter is attached to shaft 21 by means of set screw 24, and may be fixed rigidly to the shaft at any desired position along the full length of the shaft 21.

Due to the variation in widths of the rows, it is desirable to adjust the distance between the cutting elements. To accomplish this, rack bars 25 are provided and mesh with pinions 26 attached rigidly to shafts 27 which latter are rotatable by means of hand wheels 28. When the horizontal adjustment of the hoe carriages is made, these members are restrained against side-wise movement by pawls 29, engaging the rack bars.

A spring 30, suspended from casting 10 and attached to the foot of standard 8 assists the operator in raising the carriage by the hand wheel. The purpose of spring 30 is to hold the carriage in suspension from the main casting 10.

Referring specifically to the worm gears, shown in cross section in Figure 8, attention is directed to the key seat in these members as respects their relationship to the shaft.

The shaft 16, being key wayed its entire length, is permitted to move freely up and down, allowing the worm gear 16$^a$ to remain stationary and in engagement with worm gear 16$^b$ on main shaft 4, which latter is also key wayed its entire length allowing it to move horizontally without interference. The worm gear 16$^b$ is held in positive engagement with worm gear 16$^a$ by sleeves 31 on the shaft 4 and disposed between worm gear 16$^b$ and the walls of the main casting 10.

The worm gear 16$^a$ is held by the sleeve 32 on shaft 16, between the worm gear 16$^a$ and top of the main casting 10. This structure allows free horizontal movement of the main carriage, shown in cross section in Figure 2, and vertical movements of hoe standards 8, shown also in Figure 2, without affecting their normal function as respects their driving elements.

Inasmuch as the main shaft or axle 4 rotates freely in the frame 1 and castings 2 and other component parts, it is necessary to provide a means to restrain the main frame 1 and other parts from longitudinal displacement on the main shaft or axle 4. For this purpose, set collars 33 are provided to surround shaft 4 on either side of the center casting or bearing 34, which is arranged transversely through the frame, said collars being held immovable by set screws.

In turning the machine, at the end of the rows, or for any other purpose when the cutting elements are in action, means are provided to disengage the pivot wheel from the axle. When the clutch 36 is engaged, there will be no twist or strain on shaft or axle 4, as in turning and, the wheel on the outside of the turning area will normally move forward but the wheel on the inside of the turning area being released will have a tendency to turn backwards, which otherwise would cause a twist or strain on the axle 4. The clutch shown in detail in Figure 3 is composed of three parts, of which the main or driving part 37 overlaps flange 38 of the wheel and is held secure by set screw 39. The claws 40 of this member engage claws 41 of a grooved member 42, which is adapted to rotate freely on shaft 4, and which is provided with inner claws 43 extending in an opposite direction, that is to say, to act in reverse rotation of the member 42, and which engage claws 44 on a member 45 which is held rigidly to shaft 4 by means of feather key and countersunk set screws 46. It is obvious, therefore, that when the wheels 35 are normally rotating in the same direction, the clutch member 37 acts against the member 42 when these two members are brought into engagement by means of the fork 47 on the T casting 2 and are held in engagement by expansion spring 48, and the result will be to bring into engagement also the claws 44 on member 45 with the claws 43 in member 42. The rotative power is thus transmitted to shaft 4 through the claws 43 in member 42 coming into engagement with the claws 44 on member 45. The member 42, being free to rotate on the shaft, it is obvious that a reverse action of the wheel, would result in the disengagement of the claws 44 on member 45 with the claws 43 in the member 42, which will allow the wheel to turn freely on shaft 4.

In operation, the operator sits on seat 49 supported by spring or bracket 50 attached to frame casting 34. When the operator desires to adjust the width of the cutting area of the carriages this may be accomplished by the rotation of the hand wheels 28, conveniently located on either side of the rear of the machine. This is sometimes desired when the rows become narrower or when a wider uniformity is practiced in planting.

By the simple rotation of hand wheels 15 the depth of the cutting blades 18 may be gauged, or they may be raised completely out of action as is desired, when the machine is transported from one field to another.

A hand lever or foot lever, as desired, may be provided for the purpose of throwing the machine in and out of gear through the action of fork 47 on clutch member 42, it being desirable to disengage all working parts of the invention when the machine is being transported.

A tongue truck, shown in detail in Figure 7, is provided to support the tongue of the machine. This member is composed of a vertical standard 51 having a casting 52 surrounding shaft 53, the latter having a fork 54 carrying an axle 55 on which a wheel 56 is mounted.

Manifestly, the construction shown is capable of considerable modification and such modification as is considered within the scope of the following claims is also considered within the scope of the invention.

What is claimed is:

1. In a machine of the type set forth, a frame having a pair of spaced horizontal rack bars, a pair of hoe carriers each composed of a body, pinions carried by the body and in mesh with the teeth of the rack bars, means to rotate the pinions to move the body lengthwise of the rack bars, a pair of toothed standards vertically slidable on said body and in the space between the rack bars, pinions on the body in mesh with the teeth of the standards to raise and lower same, a hoe carrying shaft journaled in the lower ends of the standards, means to rotate said hoe carrying shafts, and spring means connected to the standards and to the body for resiliently supporting the standards.

2. In a machine of the type set forth, a frame having a pair of spaced horizontal rack bars, a pair of hoe carriers each composed of a body, pinions carried by the body and in mesh with the teeth of the rack bars, means to rotate the pinions to move the body lengthwise of the rack bars, a pair of toothed standards vertically slidable on said body and in the space between the rack bars, pinions on the body in mesh with the teeth of the standards to raise and lower same, a hoe carrying shaft journaled in the lower ends of the standards, and means to rotate said hoe carrying shaft.

3. In a machine of the type set forth, a frame having a pair of spaced horizontal rack bars, a pair of hoe carriers each composed of a body, pinions carried by the body and in mesh with the teeth of the rack bars, means to rotate the pinions to move the body lengthwise of the rack bars, a pair of toothed standards vertically slidable on said body and in the space between the rack bars, pinions on the body in mesh with the teeth of the standards to raise and lower same, a hoe carrying shaft journaled in the lower ends of the standards, an axle having traction wheels thereon journaled on the frame and disposed in the space between the rack bars and extending through said hoe carrier bodies to slidably support same, and means to rotate the hoe carrying shafts.

4. In combination with a frame, an axle carried by the frame and having traction wheels thereon, a pair of hoe carriers having pinions and also perforated parts through which the axle extends so as to slidably mount the carriers on the axle, and combined means to engage the pinions to hold the carriers against turning on the axle and to slide the carriers upon rotating the pinions.

5. In combination with a frame having spaced rack bars, an axle on the frame disposed in said space between the bars and having traction wheels thereon, hoe carriers having perforated parts through which the axle extends to slidably mount the carriers, pinions on the carriers in mesh with the teeth of the rack bars, and means to rotate the pinions.

6. In a machine of the type set forth, a pair of spaced bars, end members connecting the bars, an axle having traction wheels thereon extending through the end members and disposed in the space between the bars, hoe carriers on the bars perforated to receive the axle therethrough and to slide thereon, and means on the hoe carriers engaging the bars to hold the carriers against pivoting on the axle.

In testimony whereof I affix my signature.

GEORGE N. CHENAULT.